United States Patent
Sinclair

(10) Patent No.: US 8,574,404 B1
(45) Date of Patent: Nov. 5, 2013

(54) FAST PYROLYSIS PROCESSOR WHICH PRODUCES LOW OXYGEN CONTENT, LIQUID BIO-OIL

(76) Inventor: Douglas Stewart Sinclair, Jonesburg, MO (US)

(*) Notice: Subject to any disclaimer, the term of this patent is extended or adjusted under 35 U.S.C. 154(b) by 793 days.

(21) Appl. No.: 12/760,525

(22) Filed: Apr. 14, 2010

(51) Int. Cl.
*C10B 53/02* (2006.01)
*C10B 49/18* (2006.01)
*C10G 1/02* (2006.01)

(52) U.S. Cl.
USPC .............................. 201/12; 201/20; 585/242

(58) Field of Classification Search
USPC .............................. 201/12, 20; 585/242, 240
See application file for complete search history.

(56) References Cited

U.S. PATENT DOCUMENTS

| | | | |
|---|---|---|---|
| 1,135,355 A | 4/1915 | Claude | |
| 2,705,872 A | 4/1955 | Gorin | |
| 4,353,713 A | 10/1982 | Cheng | |
| 4,747,938 A * | 5/1988 | Khan | 201/20 |
| 5,496,465 A * | 3/1996 | Fraas | 201/12 |
| 6,790,430 B1 | 9/2004 | Lackner | |

OTHER PUBLICATIONS

Brown. Biorenewable Resources, 2003, pp. 182-183, Iowa State Press, Ames Iowa, USA.

* cited by examiner

*Primary Examiner* — Jill Warden
*Assistant Examiner* — Joye L Woodard

(57) ABSTRACT

In this fast pyrolysis processor the reaction conditions are tailored to minimize the production of gas, while using calcined limestone to provide the heat for fast pyrolysis of biomass and to lower the acidity and oxygen content of the liquid bio-oil which is produced.

7 Claims, 1 Drawing Sheet

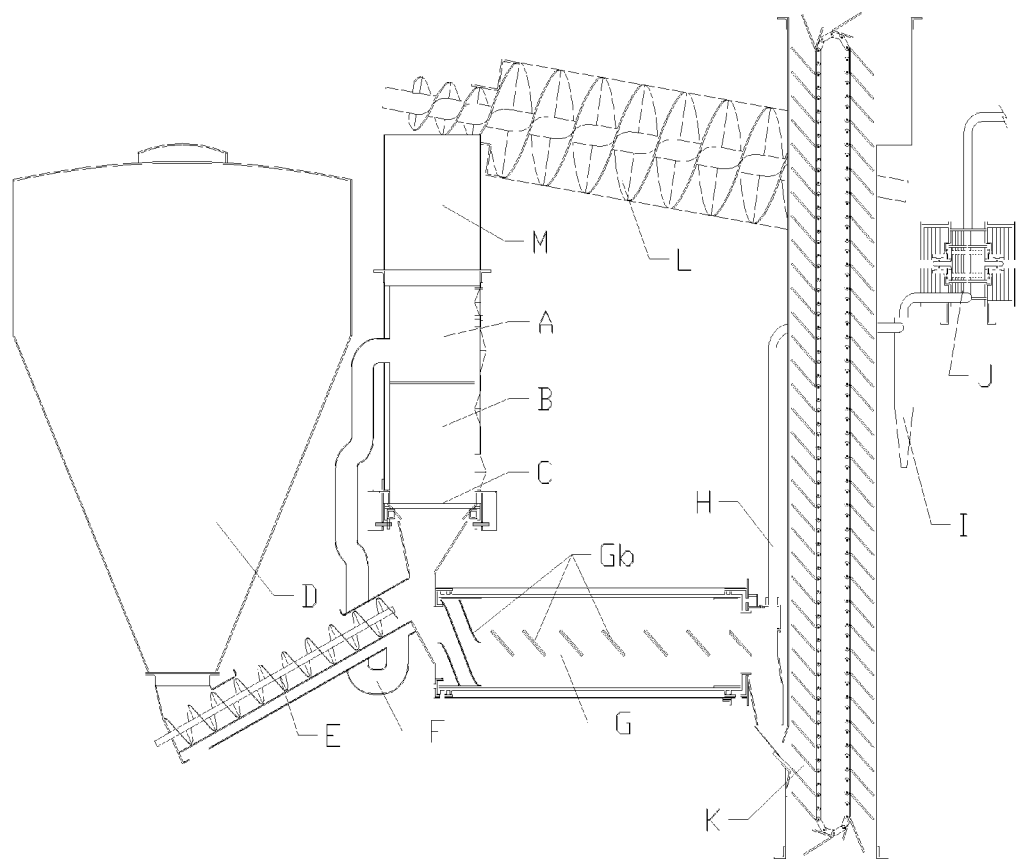

FAST PYROLYSIS PROCESSOR WHICH PRODUCES LOW OXYGEN CONTENT, LIQUID BIO-OIL

CROSS REFERENCE TO RELATED APPLICATIONS

Not Applicable

FIELD OF THE INVENTION

The present invention relates generally to using biomass as a source of renewable energy. In particular the invention relates to the production of low oxygen content pyrolysis oil from biomass.

BACKGROUND OF THE INVENTION

Biomass as an energy source is attractive for two main reasons. First, it is renewable. Second, the carbon which makes up the backbone of it's structure is drawn from the air, lowering the carbon dioxide levels which are currently causing great concern for the environment.

Unfortunately, the energy density of biomass is low. It is a bulky commodity which can be expensive to handle and transport. Often the cost of transportation is more than the value of the energy in the biomass. That is why biomass as an energy source is not currently cost competitive with other options available on the energy market.

Numerous methods, such as baling, pelleting, grinding, gasifying, and liquefying have been used over the years to pack the energy content of biomass into a more easily transportable form. Unfortunately, most of the previously tried methods have not gained significant acceptance. Liquefaction is the method which is currently receiving the most attention.

The oldest, and most widely used method of liquefying biomass is the ancient art of fermentation. In the 1800's fermentation was expanded beyond just sugars to include fermenting cellulosic ethanol. Cellulosic ethanol was produced in Europe and America during the early 1900's, but it proved to be unprofitable and was eventually abandoned. Today, recent advances in fermentation have caused a renewed look at this ancient art. But, fermentation is a slow process and ethanol facilities must be large to be economically viable. These large facilities consume more biomass than can be produced in the close surrounding area. In some instances their feedstock must be transported in over long distances. That is why one of the biggest expenses in cellulosic ethanol production has always been the cost of transporting biomass to large fermentation facilities.

A more recently discovered liquefaction process is fast pyrolysis. Brown (2003:182-183) says, "Fast pyrolysis is the rapid thermal decomposition of organic compounds in the absence of oxygen to produce liquids, gases, and char. The distribution of products depends on the biomass composition and rate and duration of heating. Liquid yields as high as 78% are possible for relatively short residence times (0.5-2 s), moderate temperatures (400-600 C.), and rapid quenching at the end of the process."

Fast pyrolysis can liquefy a lot of biomass with a relatively small processor. In fact, the invention we disclose in this patent was made small enough that a one ton per day prototype is currently in use as a small scale, trailer mounted, transportable pyrolysis processor. This processor can be taken directly to the site where biomass is produced, eliminating the cost of transporting biomass altogether.

In the past, fast pyrolysis oil never gained acceptance as an energy source because it was of low quality, and had little value as a fuel. The molecules which made up fast pyrolysis oils contained large amounts of oxygen in their structure. This made them unstable and gave them a relatively low heating value compared to petroleum based oils. They needed to be upgraded and hydrogenated to make high grade fuel. Unfortunately, fast pyrolysis oil was also very acidic, having high concentrations of organic acids. This acidity meant that normal refinery equipment would be quickly damaged while trying to upgrade typical fast pyrolysis oil.

Using Calcined Limestone in Pyrolysis Reactions

For many decades people have made use of calcined limestone, or more accurately calcined calcium carbonate ($CaCO_3$), in various ways to achieve a desired result from their pyrolysis inventions. In all these inventions, the reaction conditions were tailored to promote those aspects of the calcining/carbonation cycle which the inventor felt would be useful.

Calcining is a reversible chemical reaction that occurs when $CaCO_3$ is heated above a temperature which is heavily dependent on the level of carbon dioxide ($CO_2$) in the atmosphere. When $CaCO_3$ calcines, it absorbs heat, gives off $CO_2$, and turns into calcium oxide (CaO). In normal air this begins at about 550° C. In a $CO_2$ rich atmosphere, such as is found in a calcining chamber, the temperature will be much higher. For calcining to happen at a useful rate inside a calcining chamber the temperature must be greater than about 900° C.

When the temperature of CaO is then lowered, it absorbs $CO_2$, releases its stored heat and turns back into $CaCO_3$.

This release of $CO_2$ at high temperatures and the re-absorption of $CO_2$ at low temperatures makes $CaCO_3$ an ideal heat carrier for our pyrolysis reactor.

In the past, most inventions which made use of the calcining/carbonation cycle of $CaCO_3$, were aimed at gasifying carbonaceous solids or extracting $CO_2$ from a gaseous mixture. Many of these gasifiers also made use of the reaction $C_{(s)}+H_2O_{(g)} \rightarrow CO+H_2$ to draw carbon out of the material they sought to gasify and add to the yield of hydrogen gas produced.

In 1915, Georges Claude received U.S. Pat. No. 1,135,355 for a process to produce relatively pure hydrogen by extracting carbon monoxide from Water Gas with calcium hydroxide, which is the hydrated form of calcined lime. This invention used CO absorption, but made no use of the exothermic nature of the absorption.

In 1953, Everett Gorin received U.S. Pat. No. 2,705,672 for his process which used steam and calcium oxide to produce Water Gas from carbonaceous solids in a high temperature, high pressure reaction.

In 1982, Shang-I Cheng received U.S. Pat. No. 4,353,713 for his invention to gasify coal. His invention injects water into the reaction to consume carbon by way of the $C_{(s)}+H_2O_{(g)} \rightarrow CO+H_2$ reaction, and it injects $CO_2$ from the combustion phase to keep $CO_2$ levels high in the pyrolysis zone. His invention used the exothermic heat of the $CO_2$ absorption process to drive the pyrolysis reaction.

In 2004, Klaus S. Lackner received U.S. Pat. No. 6,790,430 for his invention to produce hydrogen from carbonaceous material. This invention is much more involved than Mr. Cheng's or Mr. Gorin's, but it still makes use of water injection to help consume carbon and increase the hydrogen yield.

A survey of the many patents that use the calcining/carbonation cycle of $CaCO_3$, shows that water or steam is usually added to increase the production of hydrogen and consume carbon by the reactions:

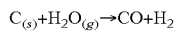

followed by

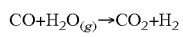

Also, in most of those previous patents, $CO_2$ levels were kept high to get more process heat from the exothermal carbonation of CaO.

SUMMARY OF THE INVENTION

In our invention we wish to reduce the oxygen content of the pyrolysis liquids. We do not know of any acceptable means of directly drawing pure oxygen out of a high temperature reaction. However, CaO will absorb $CO_2$ out of a high temperature reaction. So, to accomplish our goal of drawing oxygen out of the pyrolysis liquids, we must sacrifice a portion of the carbon in the biomass to be able to extract the unwanted oxygen.

Please note, that in our application, although one carbon atom is sacrificed, two oxygen atoms are extracted for each $CO_2$ molecule absorbed by the CaO. The net effect is a reduction in the amount of oxygen bound up in the molecular structure of the pyrolysis liquid produced.

At the same time, we wish to minimize the production of non condensable gases and also minimize the loss of carbon by the reaction $C_{(s)}+H_2O_{(g)} \rightarrow CO+H_2$. To do this we must keep the amount of $H_2O$ in the reaction chamber as low as possible.

To accomplish these goals, we use the calcining/carbonation cycle of $CaCO_3$ and tailor the reaction conditions to achieve the results we desire.

This leads to the FOUR MAIN FEATURES that, when combined in the same process, distinguish this pyrolysis process from others.

(1) The amount of $CO_2$ in the reaction chamber is kept as low as possible.

CaO absorbs $CO_2$ from the reaction zone, not directly from the molecules of the vaporized pyrolysis liquids. According to Le Chatelier's Principal, for this to effectively draw $CO_2$ out of the molecules of the vaporized pyrolysis liquids, the amount of $CO_2$ in the reaction zone must be kept as low as possible. This is in stark contrast to gasification processes where $CO_2$ levels are kept high by introducing $CO_2$ produced elsewhere into the reaction zone, to get more process heat from the exothermic conversion of CaO to $CaCO_3$.

(2) The pyrolysis temperature is kept between about 700° C. and 450° C.

The product we seek from our invention is pyrolysis liquid, not gas. To maximize the production of liquid and minimize the production of gas the temperature of the pyrolysis reaction must be kept below about 700° C. For the pyrolysis to occur at a fast enough rate to be useful, and not produce excessive amounts of char, the temperature must be kept above about 450° C.

(3) $H_2O$ in the reaction chamber is kept as low as possible.

To minimize the undesirable conversion of the biomass to hydrogen gas, the amount of water in the reaction chamber is kept as low as possible to reduce the consumption of carbon by the reaction $C_{(s)}+H_2O_{(g)} \rightarrow CO+H_2$.

(4) The calcined $CaCO_3$ bearing granular material is cooled to less than about 700° C. before entering the reaction chamber.

To calcine $CaCO_3$ and produce CaO fast enough for the process to be useful, it must be heated to over about 900° C. At that temperature CaO will not absorb $CO_2$ from a pyrolysis reaction. Therefore, after calcining, the CaO must be cooled to less than about 700° C. before being brought into contact with the biomass, in order to be able to extract $CO_2$ from the pyrolysis reaction.

The Calcining Oven

We designed our calcining oven with separate upper and lower chambers. Calcining is done in the upper chamber. Then, in the lower chamber, where there is no heating; the calcined lime is given time in a lower $CO_2$ environment so that it can continue giving off $CO_2$ while its temperature equilibrates. In the upper chamber, the limestone is quickly heated until it's outer fringes are bright yellow (about 1200° C.). The heating is done quickly so that the main body of the granule does not get as hot. The goal is to put just enough heat into the granule so that when it passes into the lower chamber and has time to thermally stabilize, the final equilibrium temperature will be about where we want to do our pyrolyzing. For maximum liquid yields this would be between 700° C. and 450° C. The precise temperature of the granules leaving the lower chamber is ultimately controlled by varying the small amount of fresh air that is allowed to flow through the lower chamber to keep $CO_2$ levels low.

What comes out of the oven is $CaCO_3$ granules, at the desired pyrolyzing temperature, with a thin coat of CaO on the outside that acts as a strong $CO_2$ absorbent and heat carrier.

Neutralizing Acids in the Pyrolysis Oil

Organic acids, such as the acetic acid which forms from acetyl radicals in the pyrolysis process, are quite prevalent in pyrolysis oils, and cause problems when trying to use, refine, or upgrade the oil. In addition to the benefit of lowering the oxygen content of the products of pyrolysis, it appears that including calcined $CaCO_3$ in the pyrolysis process can also lower the acidity of the pyrolysis products.

A test of the aqueous phase from one run of our processor showed a PH of 7.6, as opposed to reports in the literature of other researcher's pyrolysis oils which typically have PH readings in the 2.5 range.

DESCRIPTION OF THE DRAWING

The drawing shows a side view diagram of the preferred embodiment of the invention.

DESCRIPTION OF THE INVENTION $CaCO_3$ bearing granular material (hereafter, simply referred to as the "heat carrier") is calcined in a continuous flow oven (A). The calcined heat carrier flows down into a cooling chamber (B), where it cools down to the pyrolysis temperature. A shuffle tray feeder (C) regulates the flow of the heat carrier into the mixer(G).

Finely chopped biomass is held in a bulk tank (D), behind the oven. The biomass is dried and conveyed into the pyrolysis chamber by an auger (E), which has an external heating jacket that is heated by exhaust from the calcining oven, carried through pipe(F).

The dried biomass is mixed with the calcined heat carrier in a rotating drum mixer(G), which serves as the pyrolysis chamber. Inclined bats(Gb), inside the rotating drum mixer, churn the mix and move it forward.

The pyrolysis gas is drawn out through a pipe (H) from the tail end of the pyrolysis chamber. It is cleaned of ash and char by a hot gas cyclone (I) and then cooled and separated into a liquid portion and a non condensing gaseous portion in a unit (J) of our own design, which will be described in a later patent.

After the biomass is pyrolyzed in the mixing chamber, the heat carrier and remaining ash drop into a bucket elevator (K) and are carried up to a screening auger(L), mounted above and roughly parallel to the mixing chamber. The screening auger separates the ash from the larger sized heat carrier and drops the ash into a hopper to be used later as fertilizer.

The heat carrier is then dropped into a holding tank (M), where excess heat carrier is held until needed to replace heat carrier lost to attrition during cycling through the processor. From the holding tank the heat carrier flows down into the top of the oven (A), where it began its cycle through the processor.

Testing of the Pyrolysis Products

Tests of the acidity of the two phase liquid product produced by this apparatus were done by a national research laboratory. Their tests showed a Total Acid Number (TAN) of:

Aqueous Phase—17.65
Organic phase—19.04

An elemental analysis showed the oxygen content of the organic phase of our pyrolysis oil to be less than 25% on a wet, as produced basis. Most other fast pyrolysis oils tend to have oxygen contents in the 40% to 50% range.

I claim:

1. A method of producing low oxygen content pyrolysis liquid, while minimizing the production of gas, from the pyrolysis of biomass comprising:
   (a) calcining $CaCO_3$ bearing granular material at a temperature greater than about 900° C.
   (b) cooling the calcined $CaCO_3$ bearing granular material from greater than about 900° C. down to the desired pyrolysis temperature
   (c) rapidly mixing the calcined $CaCO_3$ bearing granular material at the desired pyrolysis temperature with biomass feedstock so that:
   1) heat from the calcined $CaCO_3$ bearing granular material causes fast pyrolysis of the biomass feedstock
   2) CaO in the calcined $CaCO_3$ bearing granular material absorbs $CO_2$ from the pyrolysis products
   (d) drawing the gaseous and suspended particulate pyrolysis products out of the pyrolysis chamber and separating them into a particulate portion composed primarily of char and a clean gas portion
   (e) cooling the clean gas portion, thereby condensing a liquid fraction and leaving a non-condensing gas fraction
   (f) removing the $CaCO_3$ bearing granular material and pyrolysis ash from the pyrolysis chamber, separating them, and returning the $CaCO_3$ bearing granular material to the calcining step.

2. A Method as claimed in claim 1, wherein the $CaCO_3$ bearing granular material is partly or completely comprised of crushed stone from the group: Chalk, Limestone, Marble, or Travertine.

3. A method as claimed in claim 1, wherein the $CaCO_3$ bearing granular material is calcined at a temperature less than about 1600° C.

4. A method as claimed in claim 1, wherein the desired pyrolysis temperature is between about 700° C. and 450° C.

5. A method as claimed in claim 1, wherein the separated particulate portion composed primarily of char from the gaseous and suspended particulate pyrolysis products is used as fuel for the calcining of the $CaCO_3$ bearing granular material.

6. A method as claimed in claim 1, which produces pyrolysis liquids with reduced acidity.

7. A method as claimed in claim 1, wherein the biomass feedstock is dried so as to minimize the amount of $H_2O$ taking part in the pyrolysis reaction.

* * * * *